United States Patent [19]

Takekawa

[11] Patent Number: 5,783,917
[45] Date of Patent: Jul. 21, 1998

[54] METHOD AND DEVICE FOR DRIVING DC BRUSHLESS MOTOR

[75] Inventor: Yoriyuki Takekawa, Ohsato-gun, Japan

[73] Assignee: Zexel Corporation, Tokyo, Japan

[21] Appl. No.: 726,488

[22] Filed: Oct. 7, 1996

[30] Foreign Application Priority Data

Oct. 13, 1995 [JP] Japan .................................. 7-290544

[51] Int. Cl.$^6$ ...................................................... H02P 6/18
[52] U.S. Cl. ...................... 318/439; 318/254; 318/721; 318/431
[58] Field of Search .................................. 318/138, 254, 318/430, 431, 439, 705, 720–724

[56] References Cited

U.S. PATENT DOCUMENTS

| | | | |
|---|---|---|---|
| 4,641,066 | 2/1987 | Nagata et al. ........................... | 318/254 |
| 5,036,264 | 7/1991 | Ueki ........................................ | 318/254 |
| 5,223,772 | 6/1993 | Carobolante ............................ | 318/254 |
| 5,225,759 | 7/1993 | Endo et al. ........................... | 318/254 X |

FOREIGN PATENT DOCUMENTS

HEI 59-36520 9/1984 Japan .
HEI 5-219785 8/1993 Japan .

*Primary Examiner*—Bentsu Ro
*Attorney, Agent, or Firm*—Pollock, Vande Sande & Priddy

[57] ABSTRACT

In order to enable switching of a direct current brushless motor to sensorless operation in a very short time by a device of simple configuration, the application to a commutator section of external sync signals for accelerating the rotor is stopped upon passage of a fixed time after the start of application. The fixed time is set to one necessary and sufficient for the rotor to reach a speed sufficient for enabling sensorless operation. After the application is stopped, the commutator section is controlled to commutate drive current to the drive windings according to the rotor position by commutation control signals output by a position feedback drive signal generator using sensorless signals from a position detection circuit based on back electromotive force voltages generated in the drive windings.

5 Claims, 7 Drawing Sheets

METHOD AND DEVICE FOR DRIVING DC BRUSHLESS MOTOR

BACKGROUND OF THE INVENTION

1. Field of the Invention

The present invention relates to a method and a device for driving a direct current brushless motor wherein the position of the rotor is detected and the current supplied to the drive windings is commutated based on the voltages induced in the drive windings of the motor.

2. Prior Art

Commutation of drive current to the drive windings of a DC brushless motor is generally conducted based on the rotational position of the permanent magnet rotor detected by a detector employing a magnetic sensor, optical sensor or the like. However, to cope with situations in which use of such a detector is difficult, there has been developed a DC brushless motor drive device which starts the motor in synchronous operation mode and then switches it to sensorless brushless motor operation. This device supplies the motor with an external sync signals for starting and accelerating it as a synchronous motor, detects the position of the permanent magnet rotor from the back electromotive force (BEMF) voltages induced when the permanent magnet rotor has reached a prescribed rotational speed at which sufficiently large BEMF voltages can be obtained from the drive windings, and based on the detected position commutates the drive current to the drive windings to drive the permanent magnet rotor.

Since the DC brushless motor drive device of this type switches from the synchronous motor operation mode to the DC brushless motor operation mode in the course of motor operation, the operation is apt to become unstable during the transient period following the termination of acceleration in the synchronous motor operation mode when the motor is shifting to sensorless operation in which the drive current is commutated based on the BEMF voltages of the drive windings. There are two reasons for this: the insufficient level of the induced EMF voltage and the difficulty of distinguishing between the drive signals and the EMF voltage signals.

Japanese Patent Application Public Disclosure No. Sho 59-36520 ('520) proposes to overcome this problem by detecting the phase difference between the sync signals and the BEMF (EMF) voltage signals and switching from synchronous operation to sensorless operation based on BEMF voltages in the vicinity of zero phase difference. For the same purpose, Japanese Application Public Disclosure No. Hei 5-219785 ('785) teaches operation of a DC brushless motor by increasing the frequency of the rotating magnetic field generated by the drive windings and the duty ratio of the voltage applied to the motor in a prescribed pattern for a prescribed period after motor start-up, controlling an invertor circuit to lower the duty ratio of the voltage applied to the motor to a prescribed value just before the end of the prescribed period, and detecting the position of the magnetic rotor from the voltages induced in the drive windings after passage of the prescribed period.

Since '520 requires not only a complex phase detection means but also an even more complex means for controlling the phase difference in the vicinity of zero, it greatly increases cost and further limits selection of the acceleration means and the means for EMF voltage signal generation. As such, it is low in general utility. These problems do not arise in the case of '785. However, since both it and '520 require a certain period of time for switching from synchronous motor operation to sensorless operation based on the EMF voltage of the drive windings, neither is able to switch the operating state in a short period of time. In addition, the sync signals continue to be applied to the drive windings during the transient switching period. Since this hinders the detection of the BEMF voltage required for detecting the position of the magnetic rotor, it degrades the reliability of magnetic rotor position detection. While the circuitry is relatively simple in the case of '785, the current chopping for duty control of the applied voltage is noisy. This makes it even more difficult to detect the position of the magnetic rotor from the BEMF voltage during the transient period of control switching.

SUMMARY OF THE INVENTION

One object of the present invention is to provide a method and a device for driving a direct current brushless motor which are capable of overcoming the aforesaid problems of the prior art.

Another object of the invention is to provide a method and a device for driving a direct current brushless motor which enable switching from synchronous motor operation for accelerating the magnetic rotor to sensorless operation to be conducted in a very short period of time.

Another object of the invention is to provide a method and a device for driving a direct current brushless motor which enable reliable detection of the position of the rotor after the switch from synchronous operation to sensorless operation.

For achieving these objects, this invention provides a method for driving a direct current brushless motor having a magnetic rotor and drive windings, the method comprising the steps of applying external sync signals to the DC brushless motor to start it as a synchronous motor, discontinuing the application of the external sync signals after passage from the application thereof of a fixed period of time required for BEMF voltages generated in the drive windings to reach a level sufficient for securing a position signal indicating magnetic rotor position, and thereafter controlling commutation of drive current to the drive windings based on the BEMF voltages generated in the drive windings.

The invention further provides a device for driving a direct current brushless motor having a magnetic rotor and drive windings, the device comprising a position detection circuit responsive to voltage signals induced in the drive windings for detecting rotational position of the magnetic rotor, commutator means having switching elements and adapted for supplying drive voltages to the drive windings, means for supplying acceleration control signals to ON/OFF control the switching elements of the commutator means for causing the drive windings to generate a rotating magnetic field for rotating the magnetic rotor, and position feedback drive signal generating means responsive to a detection result of the position detection circuit for supplying commutation control signals for ON/OFF controlling the switching elements of the commutator means, thereby commutating drive current to the drive windings, the acceleration control signals being supplied to the commutator means only for a fixed period of time sufficient for the magnetic rotor to reach a rotational speed of prescribed value and the commutator means being controlled by the commutation control signals after passage of the fixed period of time.

The fixed period of time is appropriately set to that required for the rotation of the magnetic rotor by the acceleration control signals to generate BEMF voltages in the drive windings of a level sufficient for securing the position signal. When the supply of the acceleration control signals to the drive windings is discontinued after the passage of the fixed period of time, the position detection circuit is applied with only the sufficiently high level BEMF voltages induced in the drive windings and can therefore reliably detect the position of the magnetic rotor. As a result, the commutation control signals produced by the position feedback drive signal generating means based on the position detection result of the position detection circuit cause the required commutation of drive current to the drive windings to be reliably conducted immediately after the supply of the acceleration control signals is discontinued. Thus all of the problems associated with the transient operation period are overcome.

The invention uses the acceleration control signals to start the DC brushless motor and then shifts to sensorless operation by discontinuing the supply of the acceleration control signals after the magnetic rotor has been accelerated. Since it can therefore be implemented with a very simple configuration, it does not lead to an increase in cost and, moreover, since the switch to sensorless operation can be achieved in a very short time, the transient operation period during which instability is likely to arise is markedly shortened. In addition, since no current flows during the shift to sensorless operation, the rotational position of the magnetic rotor can be reliably detected free from the influence of noise. Further, the fact that the method of acceleration and the method of processing the EMF voltages produce no adverse effects gives the invention high utility and broad applicability. Another advantage provided by the invention is that when the motor is in the course of being stopped it can be restarted without need for any acceleration means insofar as the magnetic rotor is still rotating under its own inertia.

The invention will be better understood and other objects and advantages thereof will be more apparent from the following detailed description of preferred embodiments with reference to the accompanying drawings.

DETAILED DESCRIPTION OF THE PREFERRED EMBODIMENTS

Figure 1:
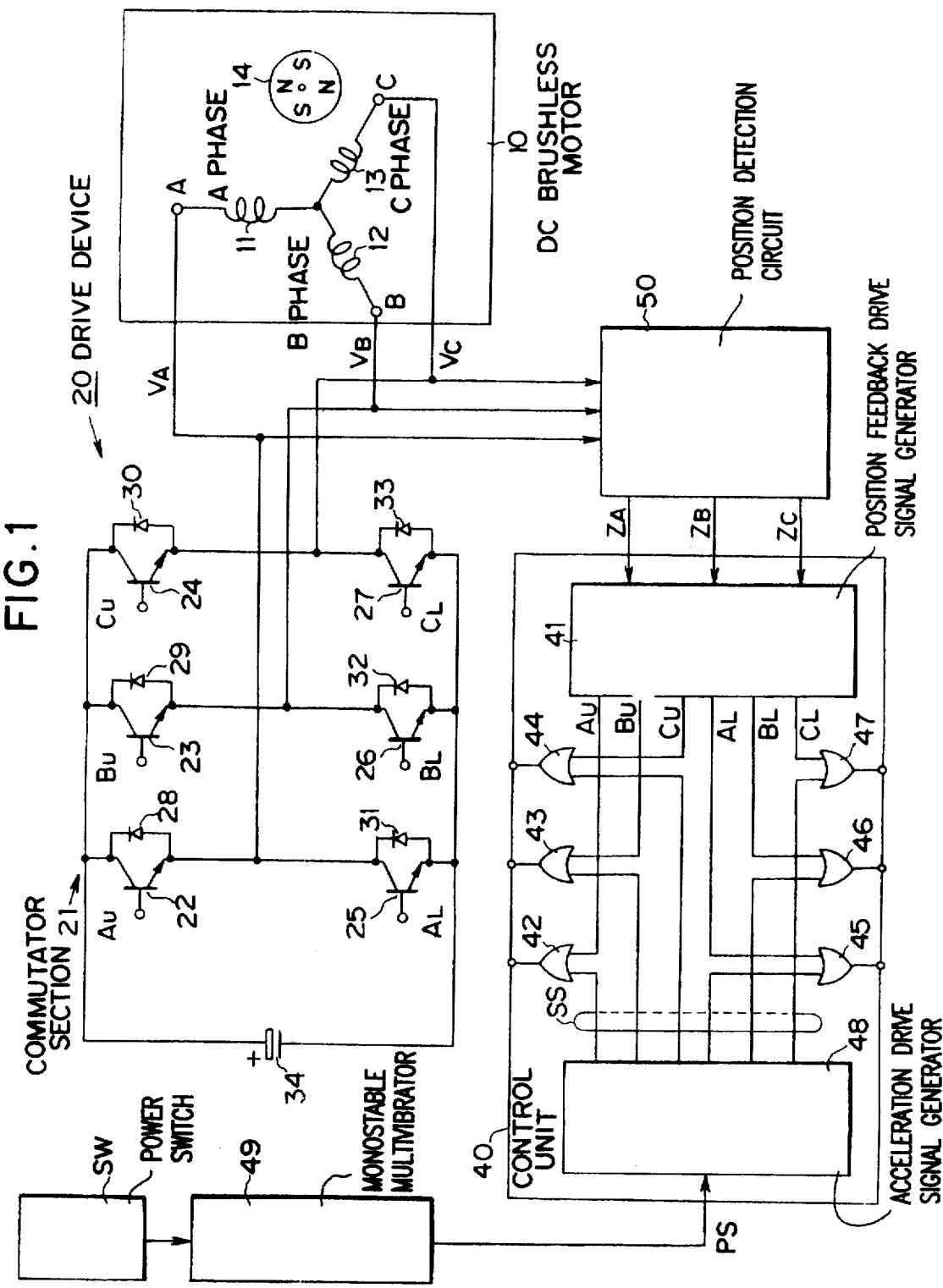
FIG. 1 is a block diagram showing the configuration of a device for driving a direct current brushless motor which is an embodiment of the invention.

As shown in FIG. 1, a three-phase, Y-connected DC brushless motor 10 has an A-phase drive winding 11, a B-phase drive winding 12, a C-phase drive winding 13 and a permanent magnet rotor 14. The DC brushless motor 10 is of conventional configuration and its structure will not be described in detail here.

The DC brushless motor 10 is driven by a drive device 20 which is an embodiment of the invention. The drive device 20 is equipped with a commutator section 21 for commutating drive current to the drive windings 11–13. As illustrated, the commutator section 21 comprises switching transistors 22–27 and diodes 28–33 connected in the conventional manner. Commutation control signals $A_U$–$C_L$ from a position feedback drive signal generator 41 of a control unit 40 are applied to the bases of the switching transistors 22–27 through associated OR gates 42–47. The switching transistors 22–27 are turned ON/OFF by the commutation control signals $A_U$–$C_L$ so as to commutate drive current supplied to the drive windings 11–13 from a DC power source 34 and thereby rotate the permanent magnet rotor 14.

Reference numeral 50 designates a position detection circuit which discriminates the rotational position of the permanent magnet rotor 14 from the BEMF voltages induced in the drive windings 11–13 owing to the rotation of the permanent magnet rotor 14 and outputs the detection result to the position feedback drive signal generator 41 of the control unit 40 as sensorless signals $Z_A$, $Z_B$, $Z_C$.

Figure 2:
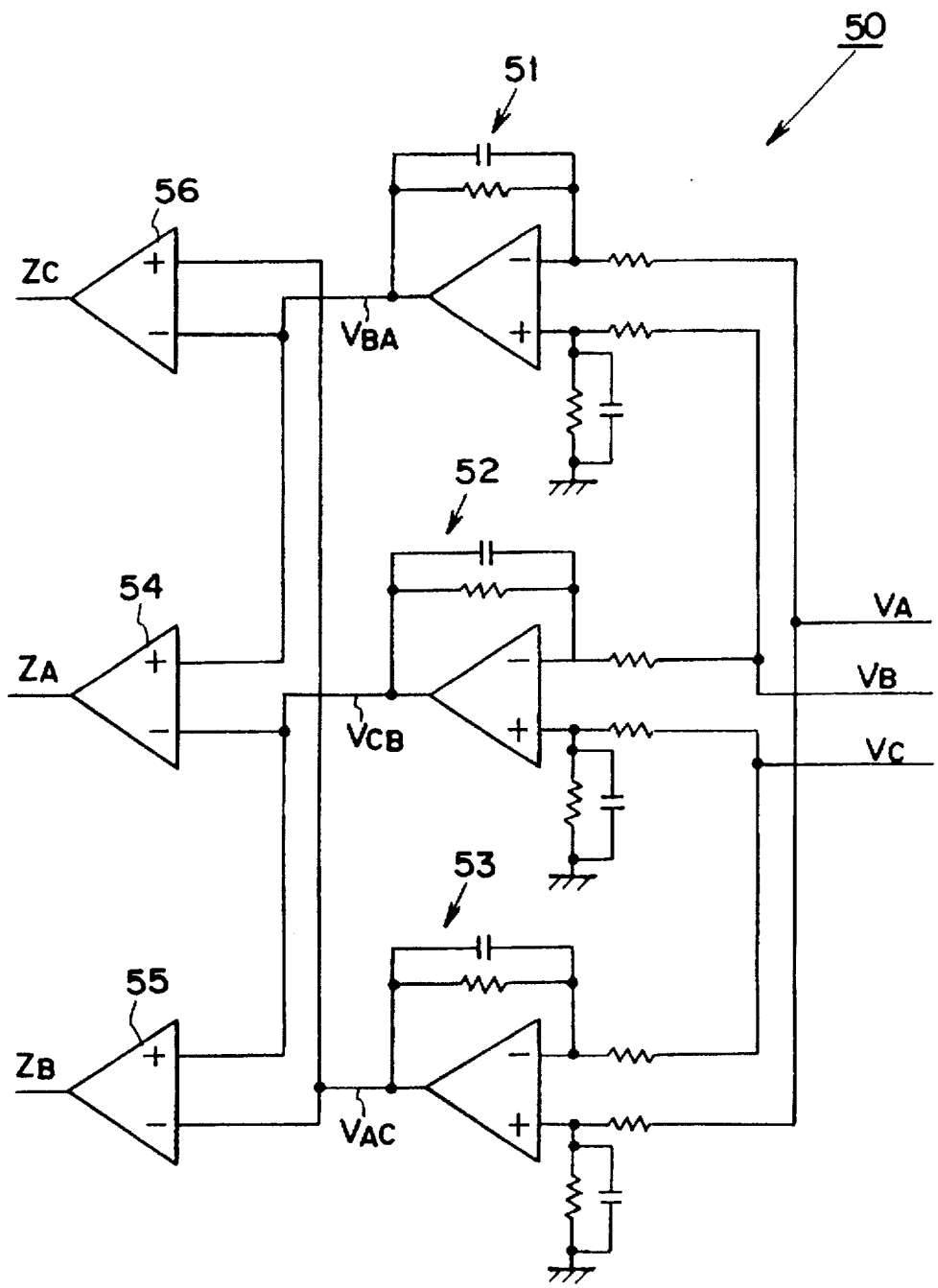
FIG. 2 is a circuit diagram showing a specific configuration of the position detection circuit shown in FIG. 1.

FIG. 2 shows the position detection circuit 50 in detail. The position detection circuit 50 includes first differential amplifiers 51, 52 and 53. When the first differential amplifier 51 receives the terminal voltage $V_A$ of the drive winding 11 and the terminal voltage $V_B$ of the drive winding 12 as input, it outputs a first voltage difference signal $V_{BA}$ representing the difference between the input voltages. When the second differential amplifier 52 receives the terminal voltage $V_B$ of the drive winding 12 and the terminal voltage $V_C$ of the drive winding 13 as input, it outputs a second voltage difference signal $V_{CB}$ representing the difference between the input voltages. When the third differential amplifier 53 receives the terminal voltage $V_C$ of the drive winding 13 and the terminal voltage $V_A$ of the drive winding 11 as input, it outputs a third voltage difference signal $V_{AC}$ representing the difference between the input voltages.

Figure 3:
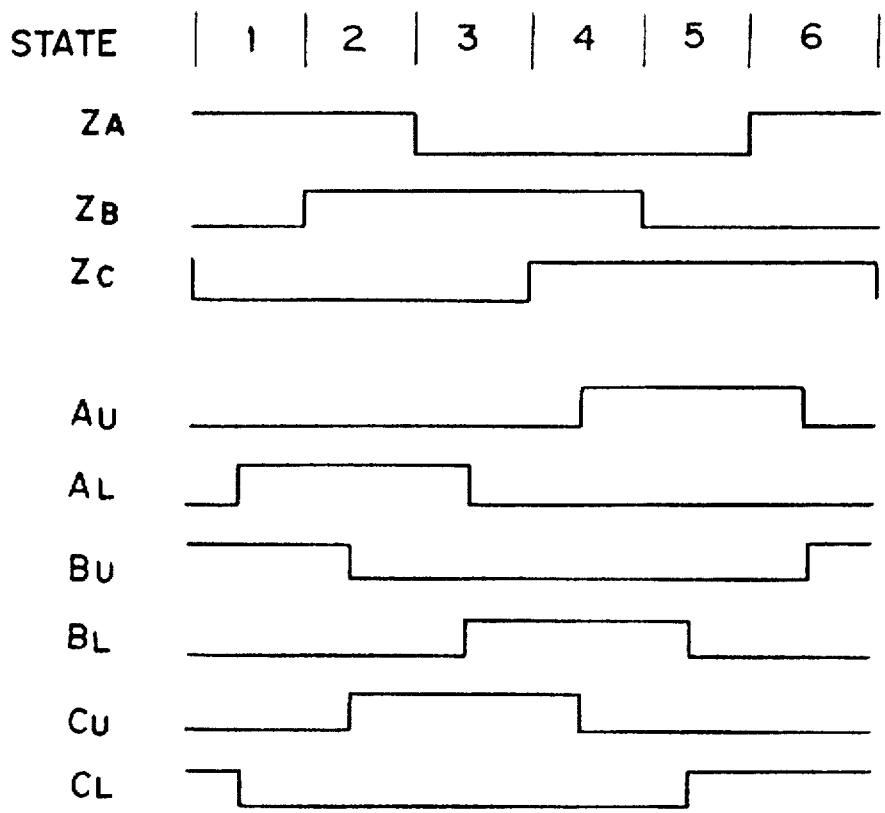
FIG. 3 is a diagram showing waveforms of sensorless signals and commutation control signals generated based thereon in the position detection circuit of FIG. 2.

A first comparator 54 of the position detection circuit 50 responds to input of the first voltage difference signal $V_{BA}$ and the second voltage difference signal $V_{CB}$ by outputting a sensorless signal $Z_A$ to the position feedback drive signal generator 41. A second comparator 55 responds to input of the second voltage difference signal $V_{CB}$ and the third voltage difference signal $V_{AC}$ by outputting a sensorless signal $Z_B$ to the position feedback drive signal generator 41. A third comparator 56 responds to input of the third voltage difference signal $V_{AC}$ and the first voltage difference signal $V_{BA}$ by outputting a sensorless signal $Z_C$ to the position feedback drive signal generator 41. The sensorless signals $Z_A$–$Z_C$ form pulse chains such as shown in FIG. 3. The rise and fall portions of the pulses represent the zero crossings of the EMF voltages generated in the drive windings 11–13.

Figure 4:
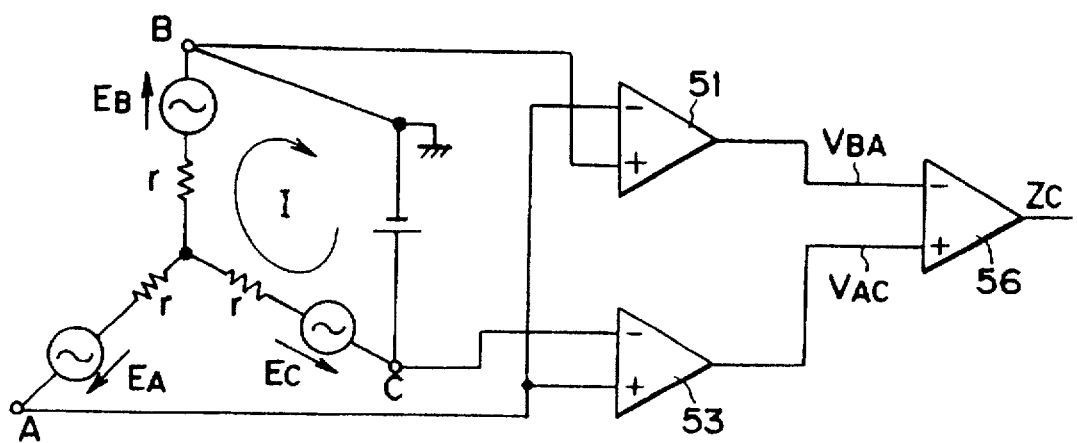
FIG. 4 is an equivalent circuit of the circuit shown in FIG. 2.

FIG. 4 is an equivalent circuit of the position detection circuit 50 shown in FIG. 2, showing the case where the switching transistors 24, 26 are ON. The first voltage difference signal $V_{BA}$ output by the first differential amplifier 51 is $$V_{BA} = E_B - E_A - I \cdot r,$$

where $E_A$ is the A-phase EMF voltage, $E_B$ is the B-phase EMF voltage, I is the drive current which flows owing to the switching transistors 24, 26 being turned ON, and r is the internal resistance of the drive windings 11-13. On the other hand, the third voltage difference signal $V_{AC}$ output by the third differential amplifier 53 is $$V_{AC}=E_A-E_C-I\cdot r,$$

where $E_C$ is the C-phase EMF voltage. Omitting the common term I·r gives $$V_{BA}=E_B-E_A$$

$$V_{AC}=E_A-E_C,$$

which are compared in the third comparator 56.

Figure 5:
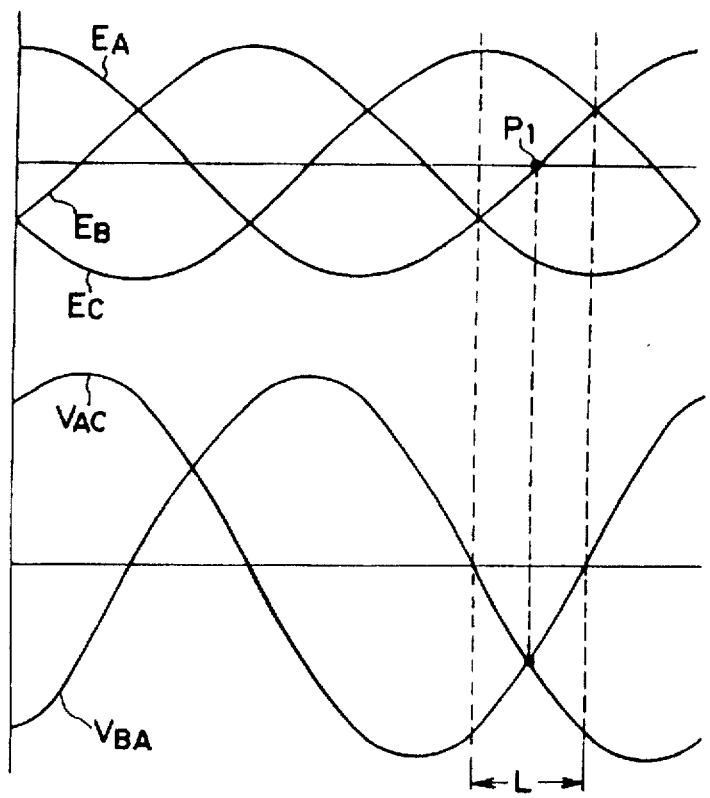
FIG. 5 is a waveform diagram related to FIG. 4, showing the relationship between (a) EMF voltages and (b) first and third voltage difference signals applied to a third comparator.

FIG. 5 is a waveform diagram related to FIG. 4, showing the relationship between (a) the EMF voltages $E_A$, $E_B$, $E_C$ and (b) the first and third voltage difference signals $V_{BA}$, $V_{AC}$ supplied to third comparator 56. As can be seen from this figure, the first voltage difference signal $V_{BA}$ and the third voltage difference signal $V_{AC}$ are equal at the zero crossing $P_1$ of the A-phase EMF voltage $E_A$. By detecting the equality of the two voltage difference signals, the comparator can detect the zero crossing. The symbol L in the figure indicates the ON interval of the switching transistors 24, 26. In addition, as can be seen from FIG. 5, the difference between the first voltage difference signal $V_{BA}$ and the third voltage difference signal $V_{AC}$ before and after the zero crossing $P_1$, i.e., in the interval L, is about twice the conventional magnitude. This greatly reduces susceptibility to noise. Moreover, since the voltage differences among the drive windings 11-13 are compared, sensorless signals can be output even when the commutation phase is shifted by ±30 degrees or more.

As shown in FIG. 1, the sensorless signals $Z_A$-$Z_C$ are input to the position feedback drive signal generator 41 of the control unit 40. The position feedback drive signal generator 41 detects the time period between the occurrence of commutation in the current cycle and the rise portion or fall portion of the sensorless signal $Z_A$-$Z_C$ as the actual zero crossing period $t_{acr}$. The position feedback drive signal generator 41 sets the desired zero crossing period $t_{ref}$, namely, the time period from the occurrence of commutation in the current cycle to the time point at which the rise portion or the fall portion of the sensorless signal $Z_A$-$Z_C$ is desired to be produced, in accordance with $$t_{ref}=(j/k)\cdot T_{n-1},$$

where $(j/k)\cdot T_{n-1}$ represents the time period up to jth one of k equal parts into which the current commutation cycle $T_{n-1}$ is divided. Ordinarily, the desired zero crossing period $t_{ref}$ is set to extend to the center of the commutation cycle by defining j=1, k=2, but can be changed as desired by changing the values of j and k. The position feedback drive signal generator 41 computes the integrated value $T_{in}$ of the next commutation cycle from the difference $\Delta t_{n-1}$ between the desired zero crossing period $t_{ref}$ and the actual zero crossing period $t_{act}$ ($\Delta t_{n-1}=t_{ref}-t_{act}$) in accordance with $$T_{in}=K_i\cdot\Delta t_{n-1}+T_{in-1},$$

where $K_i$ is an integration constant and $T_{in-n}$ is the integrated value in the current cycle. The position feedback drive signal generator 41 computes the next commutation cycle $T_n$ from the difference $\Delta t_{n-1}$ and the integrated value $T_{in}$ in the next commutation cycle in accordance with $$T_n=K_p\cdot\Delta t_{n-1}+T_{in},$$

where $K_p$ is a constant of proportionality. In addition, the position feedback drive signal generator 41 assigns the commutation control signals $A_U$-$C_L$ according to the state of the sensorless signals $Z_A$-$Z_C$ and outputs the assigned commutation control signals $A_U$-$C_L$ to the switching transistors 22-27 at the next commutation time point.

Figure 6:
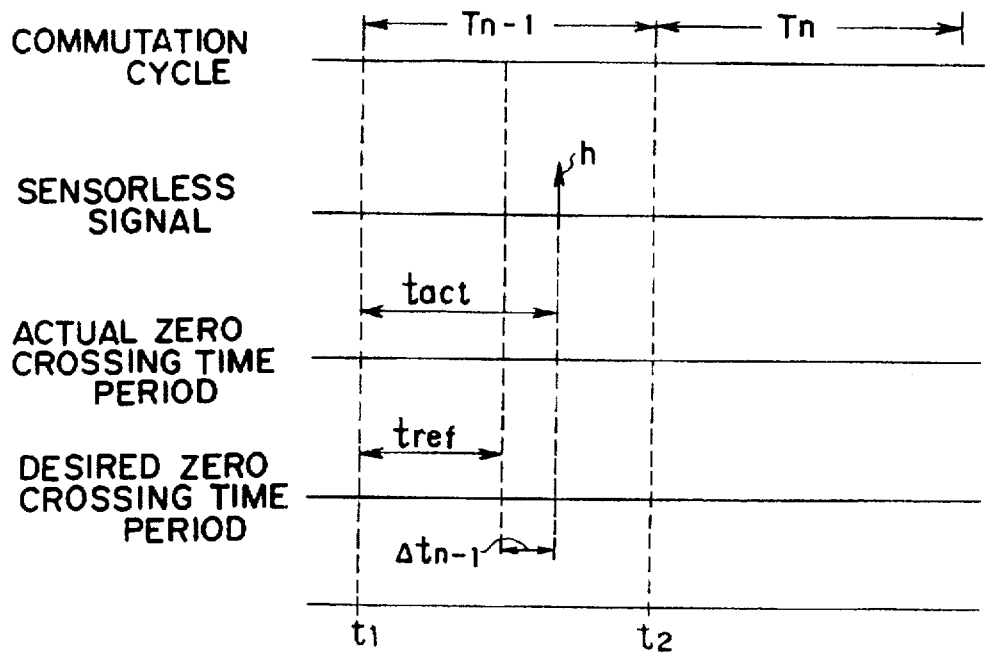
FIG. 6 is a diagram for explaining determination of the commutation cycle in the configuration of FIG. 1.

FIG. 6 is a diagram for explaining determination of the commutation cycle. The actual zero crossing period $t_{acr}$ i.e., the period between the commutation time point $t_1$ in the current cycle and the time point at which the rise or fall portion h of the sensorless signal $Z_A$-$Z_C$ is produced, is detected. The desired zero crossing period $t_{ref}$ i.e., the desired time period up to the time point at which the rise or fall portion h of the sensorless signal $Z_A$-$Z_C$ is desired to be produced, is set based on the current commutation cycle $T_{n-1}$. The difference $\Delta t_{n-1}$ between the desired zero crossing period $t_{ref}$ and the actual zero crossing period $t_{act}$ is calculated, and the equation given above is used to calculate the next commutation cycle $T_n$ from the difference $\Delta t_{n-1}$ so that the rise or fall portion h of the sensorless signal $Z_A$-$Z_C$ is produced upon passage of the desired zero crossing period $t_{ref}$.

As shown in FIG. 3, the commutation control signals $A_U$-$A_L$ are assigned in accordance with the states 1-6 of the sensorless signals $Z_A$-$Z_C$. In state 1 of the sensorless signals $Z_A$-$Z_C$, i.e., when $Z_A=1$, $Z_B=0$, $Z_C=0$, the values of the commutation control signals are assigned as $A_U=0$, $A_L=0$, $B_U=1$, $B_L=0$, $C_U=0$, $C_L=0$. In state 2, i.e., when $Z_A=1$, $Z_B=1$, $Z_C=0$, the values of the commutation control signals are assigned as $A_U=0$, $A_L=1$, $B_U=0$, $B_L=0$, $C_U=1$, $C_L=0$. In state 3, i.e., when $Z_A=0$, $Z_B=1$, $Z_C=0$, the values of the commutation control signals are assigned as $A_U=0$, $A_L=0$, $B_U=0$, $B_L=1$, $C_U=1$, $C_L=0$. In state 4, i.e., when $Z_A=0$, $Z_B=1$, $Z_C=1$, the values of the commutation control signals are assigned as $A_U=1$, $A_L=0$, $B_U=0$, $B_L=1$, $C_U=0$, $C_L=0$. In state 5, i.e., when $Z_A=0$, $Z_B=0$, $Z_C=1$, the values of the commutation control signals are assigned as $A_U=1$, $A_L=0$, $B_U=0$, $B_L=0$, $C_U=0$, $C_L=1$. In state 6, i.e., when $Z_A=1$, $Z_B=0$, $Z_C=1$, the values of the commutation control signals are assigned as $A_U=0$, $A_L=0$, $B_U=1$, $B_L=0$, $C_U=0$, $C_L=1$. The assigned commutation control signals $A_U$-$C_L$ are applied to the switching transistors 22-27 through the OR gates 42-47, whereby commutation is produced in the drive windings 11-13.

For the position feedback drive signal generator 41 to be able to produce the commutation control signals in the manner described in the foregoing, the rotation of the permanent magnet rotor 14 first has to be increased from zero to a prescribed value. The control unit 40 is therefore provided with an acceleration drive signal generator 48 for supplying the commutator section 21 with a set of acceleration control signals.

The acceleration drive signal generator 48 starts the DC brushless motor 10 in synchronous operation mode. As acceleration control signals for accelerating the DC brushless motor 10, it outputs a set of external sync signals SS for causing the drive windings 11-13 to be supplied with exciting currents for applying a rotating magnetic field to the permanent magnet rotor 14. The external sync signals SS are applied to the switching transistors 22-27 through the OR gates 42-47. Since the supply of the set of external sync signals to the switching transistors 22-27 of the commutator section 21 for operating the DC brushless motor 10 in synchronous mode is a conventional technique, the circuitry of the acceleration drive signal generator 48 will not be described in detail here. It will be noted, however, that the acceleration drive signal generator 48 is responsive to an output pulse PS from a monostable multivibrator 49 operating in response to ON/OFF switching of a power switch SW of the drive device 20 and outputs the external sync signals SS only for a fixed period of time during which the output pulse PS is at high level. The output of the external sync signals SS is discontinued upon passage of the fixed period of time. The fixed period of time is appropriately set to that required for the rotation of the permanent magnet rotor 14 started by the external sync signals SS to enable the drive windings 11, 12, 13 to produce terminal voltages $V_A$, $V_B$, $V_C$ of a sufficient level for regularly securing the sensorless signals $Z_A$–$Z_C$. The fixed period of time can therefore be appropriately determined empirically. The monostable multivibrator 49 is adjusted to maintain the output pulse PS at high level for the so-determined fixed period of time in response to ON operation of the power switch SW.

Thus immediately after power-up, the control drive device 20 shown in FIG. 1 operates the DC brushless motor 10 in synchronous mode. Specifically, the switching transistors 22–27 of the commutator section 21 are ON/OFF controlled in response to the external sync signals SS from the acceleration drive signal generator 48 of the control unit 40 so as to rotate the permanent magnet rotor 14 by applying a rotating magnetic field thereto. Upon passage of the fixed period of time, i.e., when it has become possible to secure the sensorless signals $Z_A$–$Z_C$ from the position detection circuit 50 with high reliability, the output of the external sync signals SS is discontinued, from which time the commutation control signals $A_U$–$C_L$ produced by the position feedback drive signal generator 41 based on the sensorless signals $Z_A$–$Z_C$ are applied to the switching transistors 22–27 of the commutator section 21 through the OR gates 42–47. At the same time as the supply of the external sync signals SS is stopped, therefore, the commutation control signals $A_U$–$C_L$ from the position feedback drive signal generator 41 are supplied to the commutator section 21 and drive current to the drive windings 11–13 of the DC brushless motor 10 is commutated in accordance with the position of the permanent magnet rotor 14, thereby putting the DC brushless motor 10 into sensorless operation mode.

The operation of the drive device 20 will now be described in detail with reference to FIGS. 7 and 8.

Figure 7:
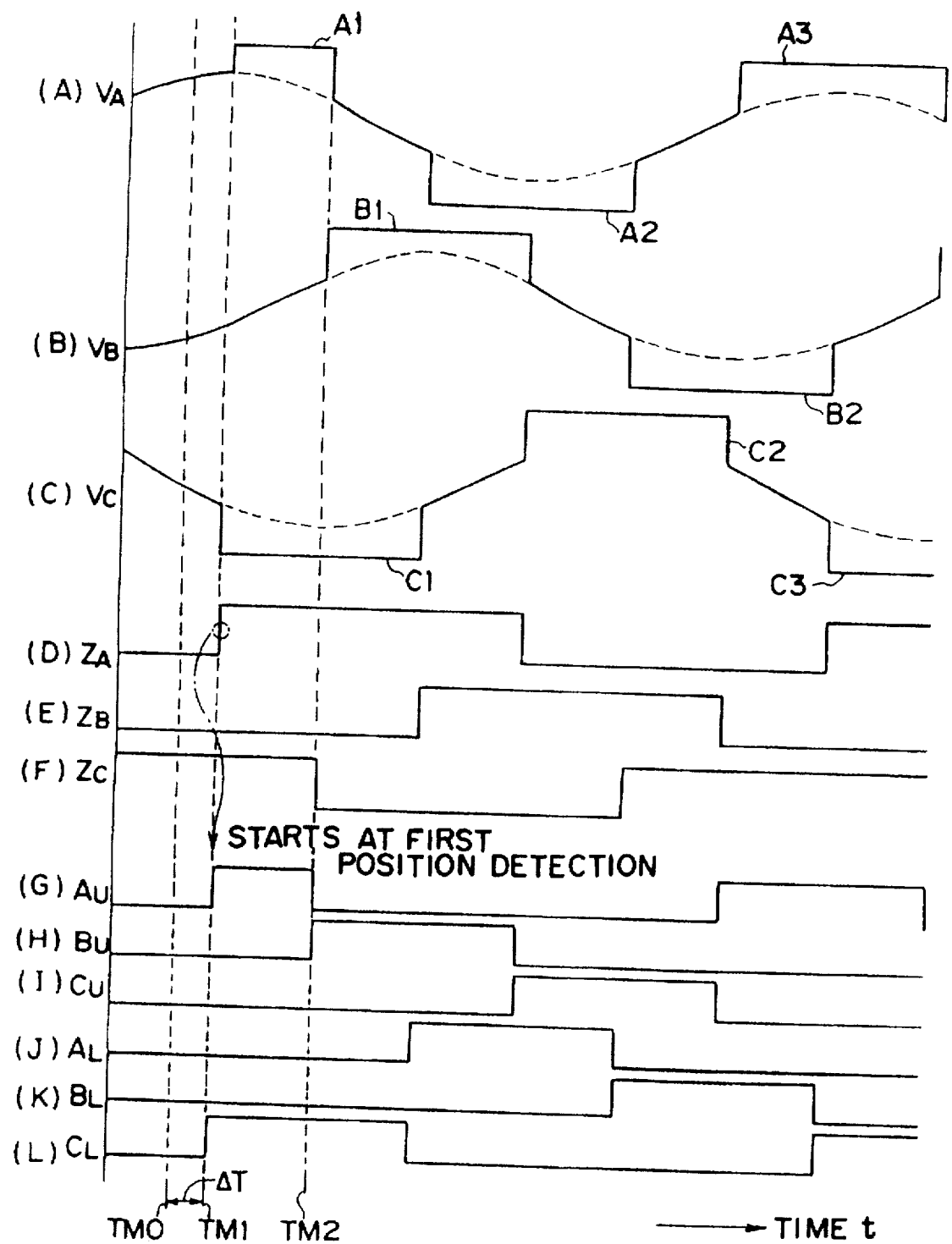
FIG. 7 is a diagram showing various waveforms for explaining drive control of a DC brushless motor by the device of FIG. 1.

FIG. 7 is a diagram showing various waveforms for explaining transition to sensorless operation in the case where the external sync signals SS are supplied from the acceleration drive signal generator 48 to the commutator section 21 up to the time point TM0, the supply of the external sync signals SS by the acceleration drive signal generator 48 is discontinued at the time point TM0, and the DC brushless motor 10 shifts to sensorless operation under the control of the commutation control signals $A_U$–$C_L$ shortly thereafter (a few hundredths of a second later) at the time point TM1.

Up to the time point TM0, the DC brushless motor 10 is operated as a synchronous motor by passing drive current through the drive windings 11–13 in accordance with the external sync signals SS. The level of the terminal voltages $V_A$, $V_B$, $V_C$ this induces in the drive windings 11–13 increases with increasing rotational speed of the permanent magnet rotor 14. In FIG. 7, the sinusoidal components of the curves (A), (B), (C) indicate the changes in level owing to the induced voltages.

At the time point TM0, the output pulse PS falls to low level state and the application of the external sync signals SS is discontinued, whereafter only the EMF voltages $E_A$, $E_B$, $E_C$ are produced in the drive windings 11–13. These are applied to the position detection circuit 50 as the voltages $V_A$, $V_B$, $V_C$. The position detection circuit 50 can therefore use the voltages $V_A$, $V_B$, $V_C$ to produce and output the sensorless signals $Z_A$, $Z_B$, $Z_C$ indicating the position of the permanent magnet rotor 14, reliably and without influence from external sync signals SS applied to the drive windings 11–13 from the outside. In the example shown in FIG. 7, the first detection is conducted in the position detection circuit 50 at the time point TM1 a short time period $\Delta T$ after the time point TM0, where the level of sensorless signal $Z_A$ has changed from 0 to 1. The position detecting operation in the position detection circuit 50 is as described earlier with reference to FIGS. 2 to 5.

As a result, the position feedback drive signal generator 41 sets the levels of only the commutation control signal $A_U$ and the commutation control signal $C_L$ to 1, only the switching devices 22 and 27 turn ON, and drive current is passed through the A-phase and C-phase drive windings 11 and 13. This state is maintained until the time point TM2 when in the position detection circuit 50 conducts the next position detection and changes the level of sensorless signal $Z_C$ from 1 to 0. At the time point TM2, the level of the commutation control signal $A_U$ changes from 1 to 0 and the level of the commutation control signal $B_U$ from 0 to 1. As a result, only the switching devices 23 and 27 turn ON, and drive current is passed through the B-phase and C-phase drive windings 12 and 13. In other words, the drive current to the drive windings is commutated. The commutation of the drive current is conducted once per 60° rotation of the permanent magnet rotor 14.

Figure 8:
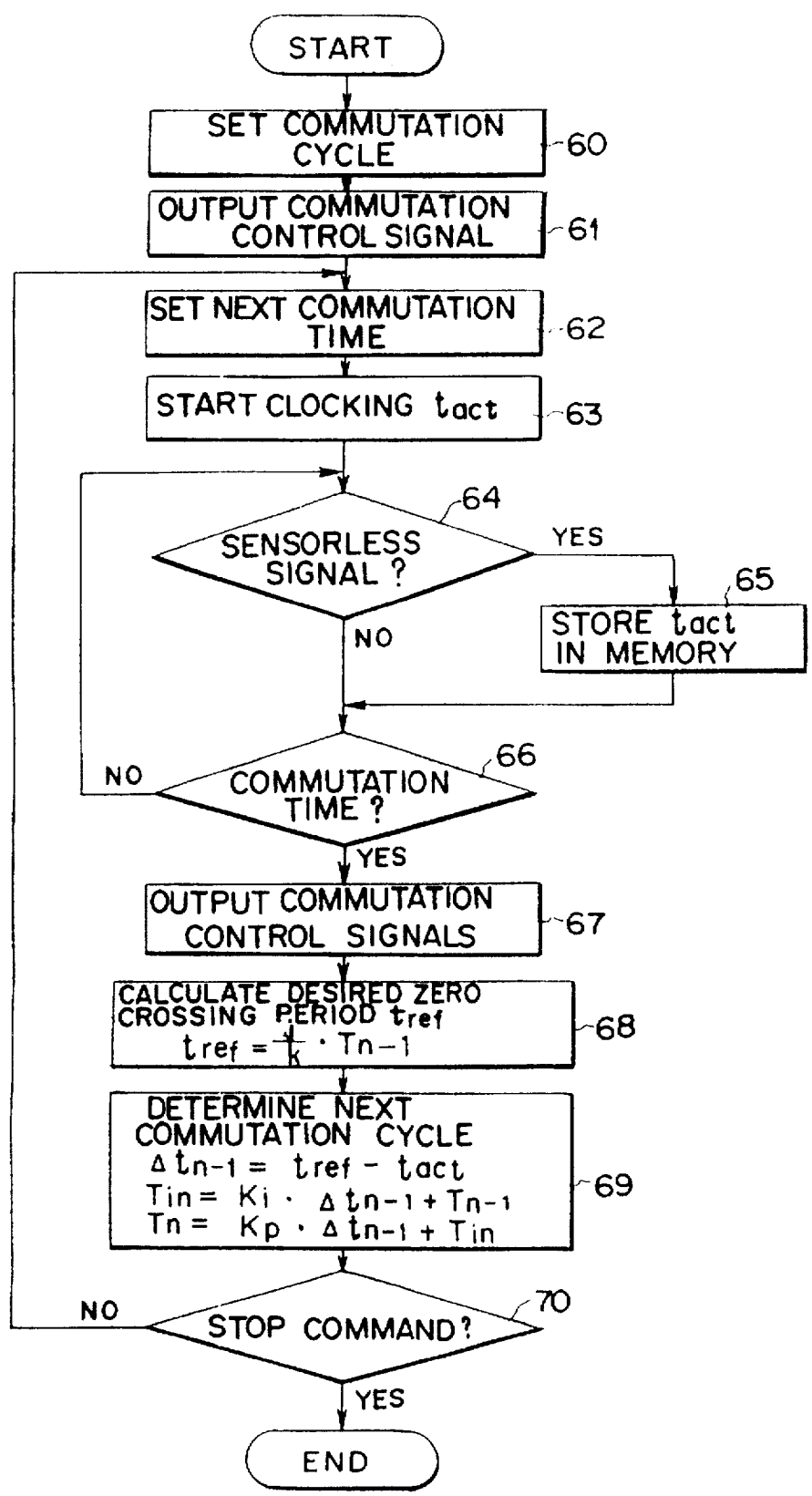
FIG. 8 is a flow chart for explaining the operation of the position feedback drive signal generator of FIG. 1.

FIG. 8 is a functional diagram for explaining the structure and functions of the position feedback drive signal generator 41. The aforesaid commutation control conducted in the position feedback drive signal generator 41 will now be explained also with reference to FIG. 8.

Starting from the time point TM1, the first differential amplifier 51 produces the first voltage difference signal $V_{BA}$, i.e., the difference between the terminal voltage of the drive winding 12 and the terminal voltage of the drive winding 11, the second differential amplifier 52 produces the second voltage difference signal $V_{CB}$, i.e., the difference between the terminal voltage of the drive winding 13 and the terminal voltage of the drive winding 12, and the third differential amplifier 53 produces the third voltage difference signal $V_{AC}$, i.e., the difference between the terminal voltage of the drive winding 11 and the terminal voltage of the drive winding 13. The first comparator 54 compares the magnitudes of the first voltage difference signal $V_{BA}$ and the second voltage difference signal $V_{CB}$ and outputs the sensorless signal $Z_A$ representing the zero crossing of the B-phase EMF voltage to the position feedback drive signal generator 41, the second comparator 55 compares the magnitudes of the second voltage difference signal $V_{CB}$ and the third voltage difference signal $V_{AC}$ and outputs the sensorless signal $Z_B$ representing the zero crossing of the C-phase EMF voltage to the position feedback drive signal generator 41, and the third comparator 56 compares the magnitudes of the first voltage difference signal $V_{BA}$ and the third voltage difference signal $V_{AC}$ and outputs the sensorless signal $Z_C$ representing the zero crossing of the A-phase EMF voltage to the position feedback drive signal generator 41. The position feedback drive signal generator 41 first sets a prescribed commutation cycle in Step 60 and then in Step 61 applies prescribed commutation control signals $A_U$–$C_L$ to the switching transistors 22–27, thereby conducting commutation and starting sensorless operation based on the sensorless signals $Z_A$–$Z_C$.

In Step 62 the position feedback drive signal generator 41 sets the time point of the next commutation with reference to the commutation cycle and in Step 63 resets and starts an internal timer in order to start clocking the actual zero crossing period $t_{act}$. Next, in Step 64, a check is made as to whether a sensorless signal $Z_A-Z_C$ rise portion or fall portion has occurred. Upon the occurrence of a sensorless signal $Z_A-Z_C$ rise portion or fall portion, the procedure passes to Step 65, where the actual zero crossing period $t_{act}$ is stored in memory, and then to Step 66. If the result in Step 64 is NO, the procedure passes directly to Step 66. Step 66 checks whether the commutation time point has arrived. If it has not, the procedure returns to Step 64, and if it has, the procedure passes to Step 67. In Step 67 the position feedback drive signal generator 41 assigns the commutation control signals $A_U-C_L$ according to the current state of the sensorless signals $Z_A-Z_C$ and forwards the assigned signals to the switching transistors 22–27. This produces another commutation. The procedures then passes from Step 67 to Step 68, in which the desired zero crossing period $t_{ref}$ is set, and then to Step 69, in which the integrated value $T_{in}$ is calculated by an integration computation based on the difference $\Delta t_{n-1}$ between the desired zero crossing period $t_{ref}$ and the actual zero crossing period $t_{act}$ and the next commutation cycle $T_n$ is determined by a proportional computation based on the difference $\Delta t_{n-1}$ and the integrated value Tin of the next commutation cycle. Next, in Step 70, it is checked whether the control unit 40 has received a DC brushless motor 10 stop command. If no stop command has been received, the result in Step 70 is NO and the procedure returns to Step 62. If a stop command has been received, the result in Step 70 is YES and the DC brushless motor 10 is allowed to stop.

From the time point TM1 on, the drive current flowing through the drive windings 11–13 is commutated according to the position of the permanent magnet rotor 14, thereby sustaining the rotation of the permanent magnet rotor 14. In FIG. 7, the rectangular wave components A1, A2, A3, B1, B2, C1, C2, C3 of the waves (A), (B), (C) indicate the drive current components flowing through the drive windings 11–13 owing to the commutation control by the position feedback drive signal generator 41.

As explained in the foregoing, the drive device 20 is characterized in that it first accelerates the rotation of the permanent magnet rotor 14 by use of the external sync signals SS and then shifts to sensorless operation after stopping the supply of the external sync signals SS. Since it therefore has a very simple configuration, it does not lead to an increase in cost and, moreover, the switch to sensorless operation can be achieved in a very short time. The invention method and device also provide a number of other advantages, including that the shift to sensorless operation can be achieved stably with optimum timing, the rotational position of the magnetic rotor can be reliably detected free from the influence of noise since no current flows during the shift to sensorless operation, the method of acceleration and the method of processing the EMF voltages produce no adverse effects so that the invention has high utility and broad applicability, and the motor can be restarted when it is in the course of being stopped, without need for any acceleration means, insofar as the magnetic rotor is still rotating under its own inertia.

While an embodiment of the invention was explained with reference to the configuration shown in FIG. 1, the invention is not limited to this configuration and the invention can instead be embodied by use of a general-purpose microcomputer of conventional circuit design as the control unit 40.

Figure 9:
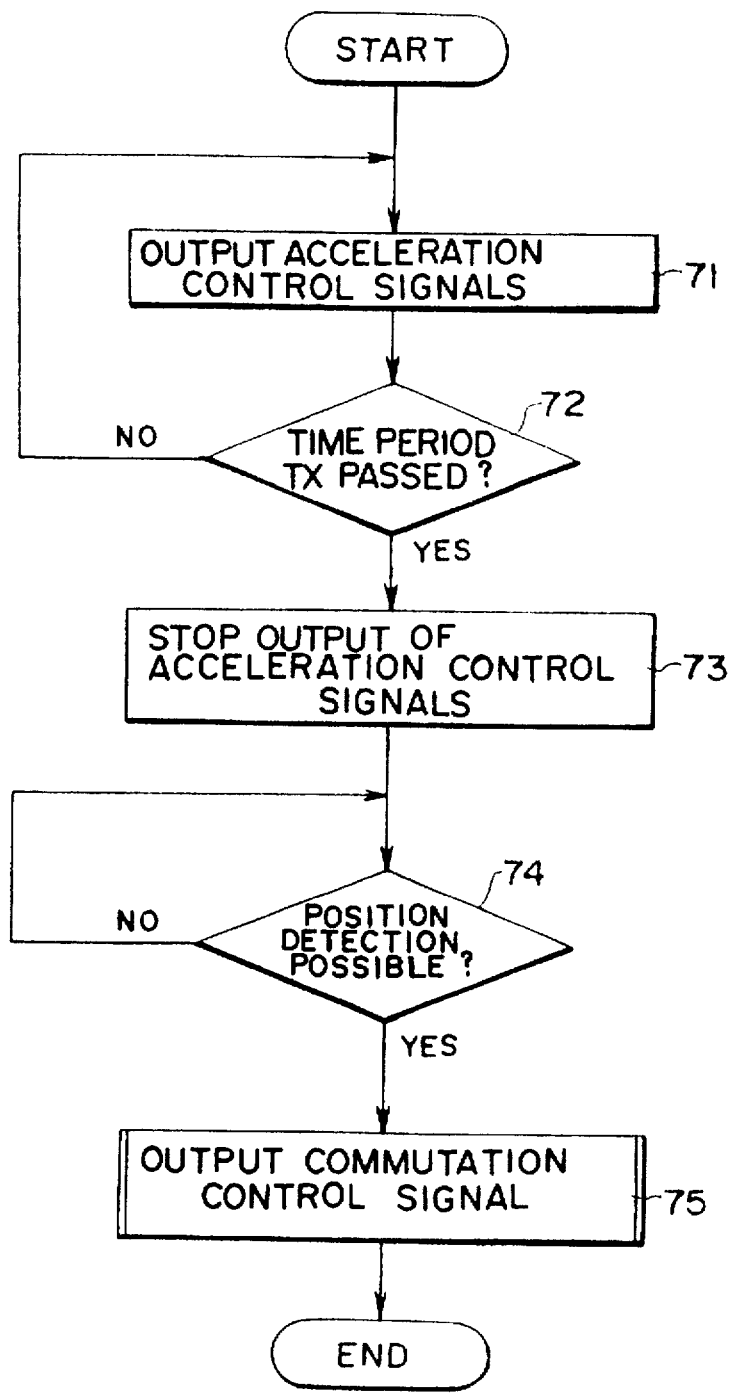
FIG. 9 is a flow chart showing an example of a control program used when a microcomputer is used as the control unit of FIG. 1.

FIG. 9 is a flow chart showing an example of a control program used when a microcomputer is used as the control unit 40 of the drive device 20 of FIG. 1. The operation of the control unit 40 constituted as a microcomputer will be explained with reference to this flow chart. Immediately after the control program has been activated, in Step 71, acceleration control signals for starting and accelerating the permanent magnet rotor 14 of the DC brushless motor 10 are output and supplied to the commutator section 21. Next, in Step 72, it is checked whether a fixed period of time TX has passed since the supply of acceleration control signals to the commutator section 21 was started. When the fixed period of time TX has not passed, the result in Step 72 is NO and control returns to Step 71, where the supply of acceleration control signals to the commutator section 21 is continued. When the fixed period of time TX has passed, the result in Step 72 is YES and control passes to step S73. Step 73 stops the output of the acceleration control signals and control passes to Step 74.

Step 74 discriminates whether it has become possible to detect the rotational position of the permanent magnet rotor 14 based on the sensorless signals $Z_A$, $Z_B$, $Z_C$ from the position detection circuit 50. This discrimination is conducted by discriminating whether the time point TM1 shown in FIG. 7 has arrived. When Step 74 finds that it has not yet become possible to detect the rotational position of the permanent magnet rotor 14 based on the sensorless signals $Z_A$, $Z_B$, $Z_C$, the result of the discrimination is NO and Step 74 is repeated. When Step 74 finds that it has become possible to detect the rotational position of the permanent magnet rotor 14 based on the sensorless signals $Z_A$, $Z_B$, $Z_C$, the result of the discrimination in Step 74 is YES and control passes to Step 75.

In Step 75, commutation control signals $A_U-C_L$ are output based on the sensorless signals $Z_A$, $Z_B$, $Z_C$ input from the position detection circuit 50. The particulars of the processing in Step 75 are the same as shown in FIG. 8. As this processing was explained earlier, it will not be discussed further here, other than to say that when the control unit 40 has not received a DC brushless motor 10 stop command, the output of the commutation control signals is continued, while when the control unit 40 has received a DC brushless motor 10 stop command, the program is terminated and the DC brushless motor 10 is allowed to stop.

What is claimed is:

1. A device for driving a direct current brushless motor having a magnetic rotor and drive windings, the device comprising:

a power switch, a commutator circuit having switching elements and adapted to supply drive voltages to the drive windings, an acceleration control signal supply unit responsive to ON operation of the power switch for supplying the commutator circuit with acceleration control signals to ON/OFF control the switching elements of the commutator circuit for causing the drive windings to generate a rotating magnetic field for rotating the magnetic rotor, and continuing the supply of the acceleration control signals only for a fixed period of time sufficient for the magnetic rotor to reach a prescribed rotational speed, a position detection circuit responsive to voltage signals induced in the drive windings by rotation of the magnetic rotor for detecting rotational position of the magnetic rotor, a position feedback drive signal generating unit responsive to a detection result of the position detection circuit for generating commutation control signals for ON/OFF controlling the switching elements of the commutator circuit, thereby commutating drive current to the drive windings, and supply circuit means for supplying the acceleration control signals to the commutator circuit;

wherein the supply circuit means is constituted of OR circuits and supplies the acceleration control signals from the acceleration control signal supply unit and the commutation control signals from the position feedback drive signal generating unit independently of each other as ON/OFF control signals to required switching elements of the commutator circuit.

2. A device as claimed in claim 1, wherein the acceleration control signal supply unit includes a signal generating unit for generating the acceleration control signals and a timing circuit means responsive to ON operation of the power switch for keeping the signal supply unit in operation only for the fixed period of time.

3. A device as claimed in claim 2, wherein the timing circuit means is a monostable multivibrator.

4. A device as claimed in claim 1, wherein the acceleration control signals are supplied to the commutator circuit through the supply circuit means.

5. A method for driving a direct current brushless motor having a magnetic rotor and drive windings and driven by a drive device constituted to control commutation of drive current to the drive windings based on back electromotive force (BEMF) voltages generated in the drive windings by rotation of the magnetic rotor, the method comprising the steps of:

applying external sync signals to the DC brushless motor to start it as a synchronous motor, discontinuing the application of the external sync signals after passage from the application thereof of a fixed period of time required for the BEMF voltages generated in the drive windings to reach a level sufficient for securing a position signal indicating magnetic rotor position, and the drive device thereafter controlling commutation of drive current to the drive windings based on the BEMF voltages generated in the drive windings;

wherein after passage of the fixed period of time a check is made as to whether or not the position signal can be secured and commutation of drive current based on the BEMF voltages is conducted if the check result is affirmative.

* * * * *